United States Patent
Denny (10) Patent No.: US 7,558,837 B1
(45) Date of Patent: Jul. 7, 2009

(54) METHOD AND SYSTEM FOR REDIRECTING AN ELECTRONIC CONTENT REQUEST TO AN ALTERNATE CONTENT TRANSPORT MECHANISM OR STORAGE SITE

(75) Inventor: Michael S. Denny, Sharpsburg, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 503 days.

(21) Appl. No.: 10/172,244

(22) Filed: Jun. 14, 2002

(51) Int. Cl.
*G06F 15/16* (2006.01)
*G06F 15/173* (2006.01)

(52) U.S. Cl. ............... 709/217; 709/218; 709/219; 709/238; 709/245

(58) Field of Classification Search ............... 709/203, 709/235, 217–219, 238, 245; 715/513; 725/115; 707/1, 100
See application file for complete search history.

(56) References Cited

U.S. PATENT DOCUMENTS

| | | | | |
|---|---|---|---|---|
| 6,463,447 | B2 * | 10/2002 | Marks et al. | 715/513 |
| 6,535,509 | B2 * | 3/2003 | Amicangioli | 370/389 |
| 7,039,709 | B1 * | 5/2006 | Beadle et al. | 709/227 |
| 2001/0025256 | A1 * | 9/2001 | Oliphant et al. | 705/26 |
| 2002/0004855 | A1 * | 1/2002 | Cox et al. | 709/328 |
| 2002/0069261 | A1 * | 6/2002 | Bellare et al. | 709/218 |
| 2002/0073167 | A1 * | 6/2002 | Powell et al. | 709/217 |
| 2002/0083187 | A1 * | 6/2002 | Sim et al. | 709/235 |
| 2002/0198937 | A1 * | 12/2002 | Diwan et al. | 709/203 |
| 2003/0009538 | A1 * | 1/2003 | Shah et al. | 709/219 |
| 2003/0121055 | A1 * | 6/2003 | Kaminski et al. | 725/115 |
| 2003/0135464 | A1 * | 7/2003 | Mourad et al. | 705/50 |
| 2004/0205339 | A1 * | 10/2004 | Medin | 713/163 |
| 2005/0246393 | A1 * | 11/2005 | Coates et al. | 707/200 |

\* cited by examiner

*Primary Examiner*—Kenny S Lin
*Assistant Examiner*—Angela Widhalm
(74) *Attorney, Agent, or Firm*—Larson Newman; Abel & Polansky, LLP (57) ABSTRACT

A method and system are provided for redirecting an electronic content request to an alternate content transport mechanism. Electronic content received from a first transport mechanism, such as a satellite broadcast system, is transmitted to and stored at an end-user content cache. If the user subsequently requests content from an alternate transport mechanism, such as the Internet, a transport proxy server intercepts the request. The transport proxy server compares the URL entered by the user with a database of URLs associated with web site content that has been transmitted to and stored at the user's local content cache via the first transport mechanism. If the content requested by the user is presently stored on the user's local content cache, the user's request is redirected to the device or access application for the first transport mechanism which then retrieves and delivers the requested content from the local storage cache. Needless connection to the Internet web site to obtain the content via the second transport mechanism is avoided.

23 Claims, 8 Drawing Sheets

METHOD AND SYSTEM FOR REDIRECTING AN ELECTRONIC CONTENT REQUEST TO AN ALTERNATE CONTENT TRANSPORT MECHANISM OR STORAGE SITE

FIELD OF THE INVENTION

The present invention is directed to a method and system for redirecting an electronic content request to an alternate content transport mechanism or alternate content storage site.

BACKGROUND OF THE INVENTION

With the advent of the Internet, individual users, businesses, educational institutions, recreational institutions, and the like request and receive vast amounts of useful and entertaining content from a variety of sources. For example, requests are made over the Internet to web sites provided by news agencies, informational systems, and entertainment systems. Such requests typically include the user entering a uniform resource locator (URL) for the desired web site into an Internet browser application on the user's local computer. The content request travels across the Internet to the specified web site, and the user may then view or download information by pulling that information back across the Internet to the user's local computer.

In recent years, it has become popular for a variety of information content providers, particularly broadcast media providers such as news broadcast organizations, to package content according to the desires of their subscribers and transmit that content via satellite or via cable directly to the user's home, office, school, and the like. Once the information is received at the user's site, the information is stored in a local cache for later review by the user. For example, a user may subscribe to a popular sports news network to have the sports news network broadcast on an hourly basis all news clips pertaining to a given sport, for example basketball, or pertaining to a given sports team. Accordingly, each hour the content subscribed to by the user is packaged by the sports news network and broadcast via satellite or via cable to the user's local computer where it is stored for later review by the user.

Typically, the broadcast organizations that package information for delivery as described above also simultaneously publish that information on an Internet web site operated by each of those organizations. Often, a user logs onto the user's local personal computer and using their Internet browser application enters the URL of an Internet web site to obtain content to which the user has subscribed under the broadcast content mechanism, described above. For example, even if the user has subscribed to a sports news organization to have the sports information for a given sport sent to the user's home on a periodic basis, the user may still enter the URL of the Internet web site of the same sports news organization to receive the identical content that already has been broadcast to the user's home and has been stored for review by the user. Unfortunately, the user may have forgotten that the content the user is now requesting is available on the local cache, or the user may believe that the content the user is requesting is of a newer version or is otherwise different from the content stored on the local cache.

If the user's second content request is provided from the requested web site, the user will receive the identical content already stored on the local cache. Unfortunately, the user will have needlessly tied up the resources, including data link bandwidth and processing time, required to pull the content across the Internet to the user's local computer even though the requested content is already stored locally for access by the user.

It is with respect to these and other considerations that the present invention has been made.

SUMMARY OF THE INVENTION

The present invention is directed to a method and system for redirecting an electronic content request to an alternate content transport mechanism. Generally described, according to embodiments of the present invention, electronic content received from a first transport mechanism, such as a satellite broadcast system, is transmitted to and stored at an end-user content cache. If the user subsequently requests content from an alternate transport mechanism, such as the Internet, a transport proxy server intercepts the request. The transport proxy server compares the URL entered by the user with a database of URLs associated with web site content that has been transmitted to and stored at the user's local content cache via the first transport mechanism. If the content requested by the user is presently stored on the user's local content cache, the user's request is redirected to the device or access application for the first transport mechanism which then retrieves and delivers the requested content from the local storage cache. Needless connection to the Internet web site to obtain the content via the second transport mechanism is avoided.

More particularly described, the method and system of the present invention include requesting and receiving content from a first transport mechanism and storing that content in an end user's site. If a user requests content from a second transport mechanism, a determination is made as to whether the requested content is stored at the end user's site. If the requested content is stored at the end user's site, the requested content is accessed from the end user's site in response to the request for the content. The content received from the first transport mechanism may be stored at a local content cache at the end user's site, or the content may be stored at a content cache at a telecommunications system central office site.

When the content is delivered to the end user's site via the first transport mechanism, the content is also stored for delivery to the end user's site via the second transport mechanism. Storage for delivery via the second transport mechanism includes publishing the content on an Internet web site of the provider of the content stored at the end user's site via the first transport mechanism. In addition to storing the information for delivery to the end user's site via the Internet web site of the provider of the content, the provider of the content prepares location information for associating the content sent to the end user's site via the first transport mechanism with content stored for delivery via the second transport mechanism. Location information so prepared is saved to a content management system and includes a Uniform Resource Locator (URL) designating the location of the content via the Internet web site.

Location information provided to the content management system is forwarded to a transport proxy server located at a telecommunications system central office site. When a request is made for content via the second transport mechanism, the request is intercepted by the transport proxy server, and a determination is made as to whether the requested content is stored at the end user's site. The determination includes parsing a database of location information to determine whether the requested content has location information associated with content stored at the end user's site. That is, a determination is made as to whether a URL entered as part of the request for content via the second transport mechanism is associated with a web site containing the same content that has been stored at the end user's site and that is accessible at the end user's site via the first transport mechanism.

If the content requested via the second transport mechanism is already stored at the end user's site via the first transport mechanism, the request for content is redirected back to the end user's site, and the requested content is downloaded from the local content cache at the end user's site. Likewise, if the requested content is already stored at a local content cache at the telecommunications system central office site, the request for information via the second transport mechanism is redirected to the local content cache at the telecommunications system central office site and the content is downloaded to the end user's site for presentation to an end user.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

In the following detailed description, references are made to the accompanying drawings that form a part hereof, and in which are shown by way of illustration of specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
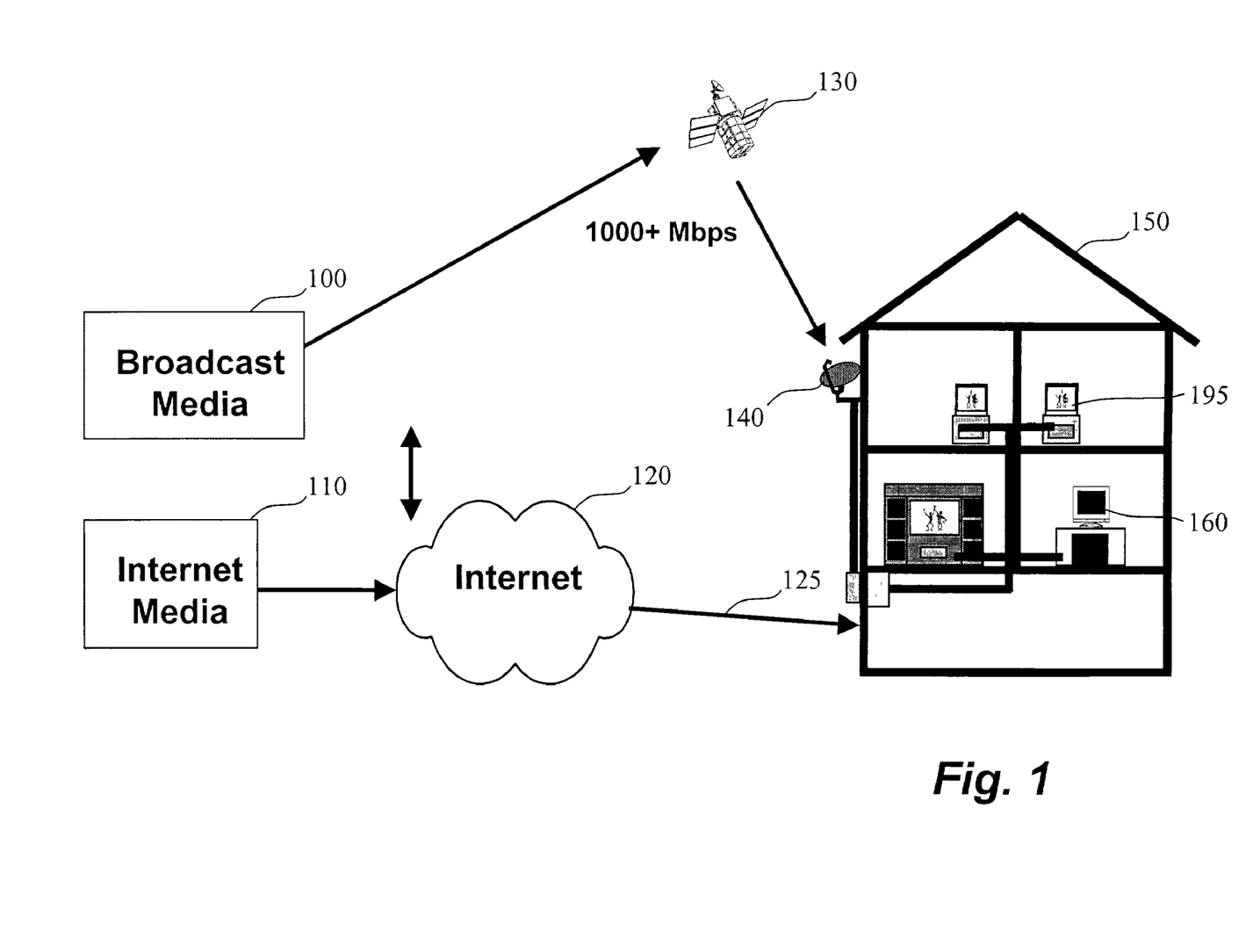
FIG. 1 is a simplified block diagram showing components of a telecommunications system for providing broadcast media data and Internet-based data to an end-user site.

Referring now to the drawings, in which like numerals represent like elements through the several figures, aspects of the present invention and the exemplary operating environment will be described. FIG. 1 is a simplified block diagram showing components of a telecommunications system for providing broadcast media data and Internet-based data to an end-user site. Broadcast media 100 is representative of any broadcast media organization, such as a news organization or information-content provider, that packages electronic content and transmits that content via satellite 130 or via cable (not shown) or other suitable transmission protocol to an end-user site 150 for subsequent review at the end-user site 150. As illustrated in FIG. 1, the broadcast media is received by a receiver 140 at the end-user site 150 for playback via a personal computer 160 or a television 195. As should be understood by those skilled in the art, the broadcast media may be played back at the end-user site 150 using other devices, such as stereo equipment and personal digital assistants. As described in the Background section above, in a typical setting, a broadcast media content provider, such as a news organization, packages clips of requested information, such as news relating to a particular topic and broadcasts that information to the end-user site 150 on a periodic basis such as hourly, daily or weekly.

Internet media 110 is representative of Internet-based web sites where electronic content is published by a variety of news organizations, entertainment providers, and general information content providers. Upon the request of an end user at the end-user site 150, information content is pulled from the Internet media site 110 across the Internet 120 and across a data link 125 to the end-user site 150. As described above, typically broadcast media organizations and institutions providing information content via the broadcast media 100 also publish that information on Internet-based web sites operated by those organizations to make the same content available to end users via the Internet media 110 and Internet 120. Accordingly, identical information content may be received at the end-user site 150 via two separate content transports mechanisms.

Figure 2:
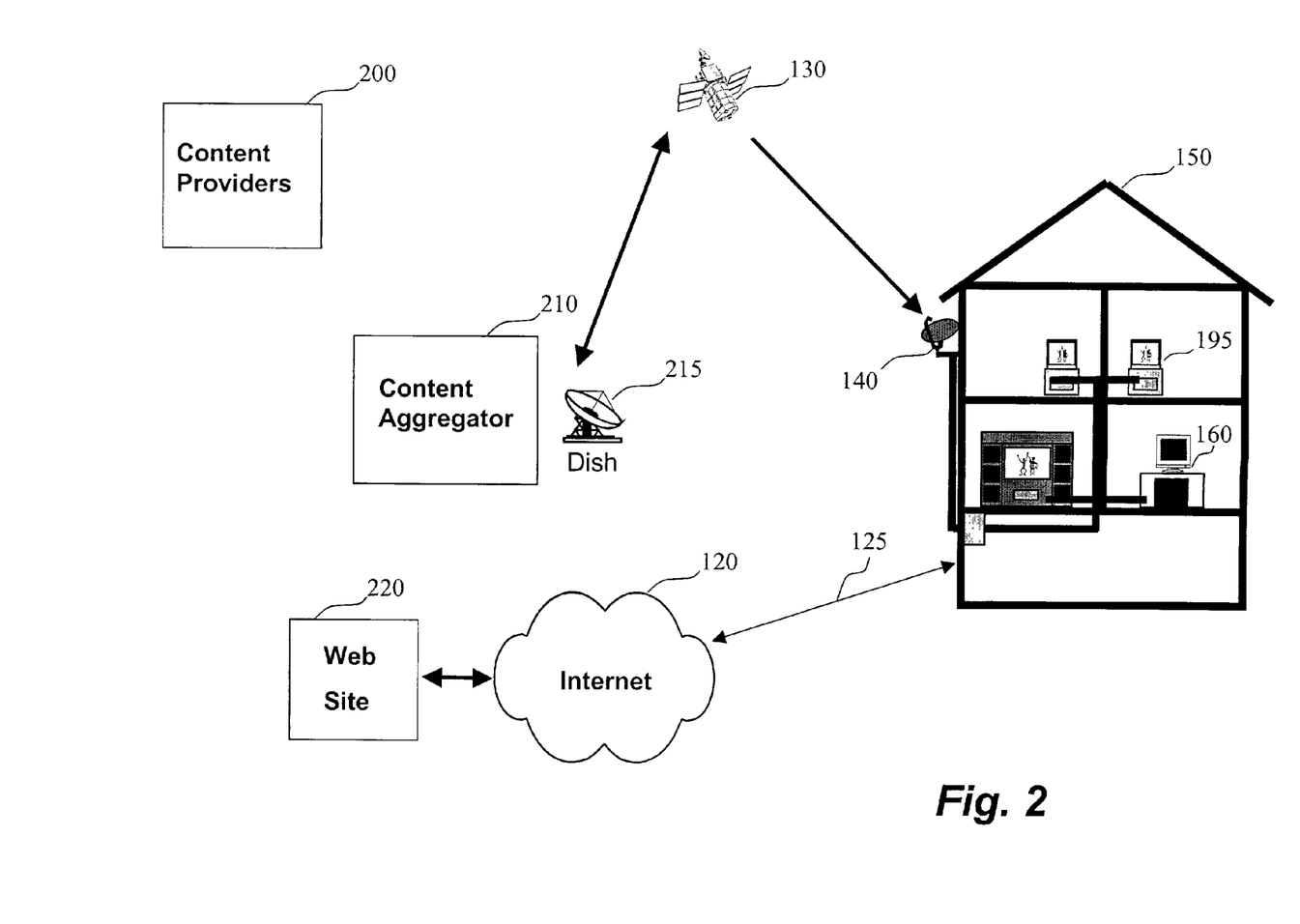
FIG. 2 is a simplified block diagram showing components of a telecommunications system and illustrating the transmission of electronic content from a content provider to an end-user site via separate content transport mechanisms.

FIG. 2 is a simplified block diagram showing components of a telecommunications system and illustrating the transmission of electronic content from a content provider to an end-user site via separate content transport mechanisms. With the increased volume of content requests in recent years, a number of content-distribution networks (CDN) have been developed for aggregating content from a number of sources or content providers at a content aggregator 210 for subsequent distribution to end users at an end-user site 150. The content provider 200 is representative of a number of information-content providers such as a variety of news organizations, sports information systems, educational information systems and the like.

The information from a number of content providers 200 is combined or aggregated at the content aggregator 210 for subsequent transmission via the satellite 130 or a similarly effective cable system or other transmission system to the end user site 150. As should be understood by those skilled in the art, the content aggregator 210 may be in the form of a server system, including a collection of computers, databases, and memory storage units, capable of receiving and aggregating electronic content from a variety of content providers 200 for subsequent transmission to end users. In a typical environment, content aggregators are particularly useful for distributing audio, video, and multimedia content via satellite 130, as illustrated in FIG. 2. Once the content is transmitted from the content aggregator 210 to the end-user site 150, that information may be stored at the end-user site 150 for subsequent review by the subscriber to that information.

As illustrated in FIG. 2, the content deposited with the content aggregator 210 by the content providers 200 typically is also published on an Internet web site 220 of the content provider for access by end users at an end-user site 150 via the Internet 120. For example, a given sports news network, operating as a content provider 200, may send to the content aggregator 210 all sports information related to a given sport, such as basketball, for provision to a subscriber at an end-user site 150. Likewise, that same sports news network simultaneously may publish the same electronic content to the web site 220 for access by end users via the Internet 120.

Figure 3:
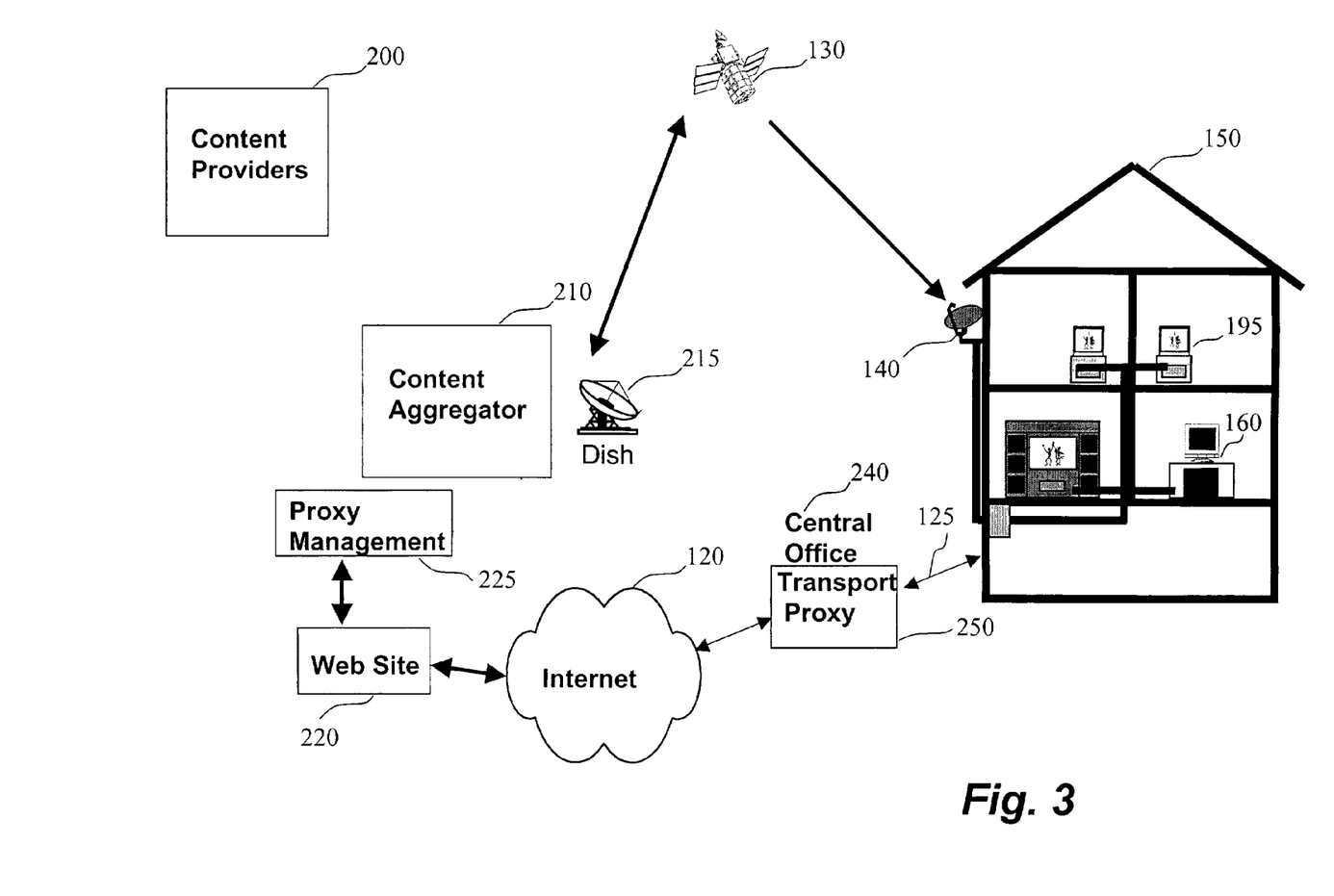
FIG. 3 is a simplified block diagram of the system illustrated in FIG. 2 including a proxy management system for managing electronic content and illustrating a telecommunications system central office site including a transport proxy server for processing content requests according to an embodiment of the present invention.

FIG. 3 is a simplified block diagram of the system illustrated in FIG. 2 including a content management system or proxy management system for managing electronic content and illustrating a telecommunications system central office site including a transport proxy server for processing content requests according to an embodiment of the present invention. A transport proxy server 250 is located in a telecommunications systems central office site 240 for redirecting electronic content requests made by an end user via one transport mechanism to an alternate content transport mechanism in order to avoid the needless downloading of content to an end user where that content is already available to the end user via the alternate transport mechanism. As described in detail below, if the end user already has received and stored locally a particular electronic content from a content provider 200 via the content aggregator 210 and satellite system 130, a subsequent request for the same content via a different transport mechanism, such as the Internet 120 and web site 220, is intercepted by the transport proxy server 240. The user's subsequent request for the same content is then directed back to the local storage medium at the end-user site 150 and is provided to the user. Provision to the user of electronic content already available to the user via the local storage medium at the end-user site 150 avoids connection to the web site 220 to pull the same information over the Internet 120 to the end-user site 150. Data link bandwidth and processing time associated with the subsequent request to pull electronic content from the web site 220 across the Internet 120 is saved.

The transport proxy server redirects content requests to an alternate transport mechanism by matching a content request intercepted from the end-user site 150 against a database of content identifiers known to have been stored in the local cache at the end-user site 150 from an alternate transport mechanism. In order to provide the transport proxy server 240 with this information, content providers 200 via the content aggregator 210 may download to a proxy management system (PMS) the Uniform Resource Locators (URL) associated with Internet web sites 220 where content already transmitted to the end user site 150 via a first transport mechanism has been published for retrieval via the Internet 120. When content is transmitted to end user sites 150, according to the first transport mechanism and is published on Internet web site 220 for retrieval via a second transport mechanism, the PMS forwards to the transport proxy server 240 the URLs associated with the web site locations of that content. Accordingly, when an end user from the end-user site 150 requests content from a particular web site by typing into the user's Internet browser application a given URL, the transport proxy server 240 may compare that URL with an index or URLs received from the PMS to determine whether the content associated with the URL entered by the end user has already been received and stored at the end-user site via a different transport mechanism.

Figure 4:
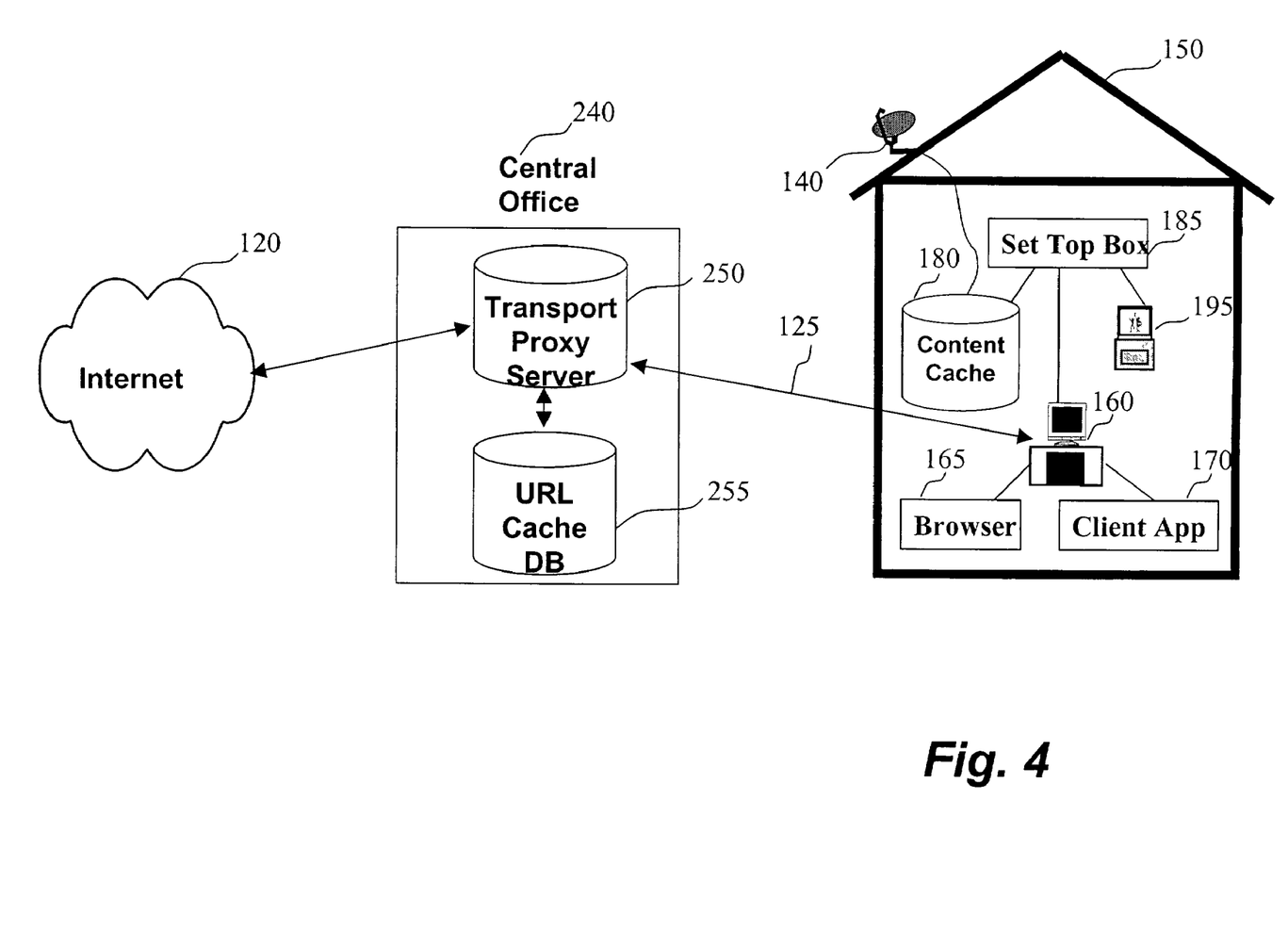
FIG. 4 is a simplified block diagram illustrating the components of an end-user site for receiving, storing, and utilizing received broadcast media content and for processing electronic content requests through a transport proxy server according to an embodiment of the present invention.

FIG. 4 is a simplified block diagram illustrating the components of an end-user site for receiving, storing, and utilizing received broadcast media content and for processing electronic content requests through a transport proxy server according to an embodiment of the present invention. According to an embodiment of the present invention, the end-user site 150 may be the home of an end user, a business, educational institution, recreational institution, and the like. A personal computer 160 is provided for receiving and viewing electronic information content. The personal computer may have any suitable operating system with sufficient processing speed and memory capacity for maintaining and operating an Internet browser 165 for requesting, obtaining, storing and reviewing electronic content from the broadcast media transport mechanism or from the Internet media transport mechanism, described above. A suitable Internet browser includes Internet Explorer® manufactured by Microsoft Corporation of Redmond, Wash. A client application 170 is stored and operates on the personal computer 160 for processing data content requests, retrieval, and review of content according to one embodiment of the present invention. The client application 170 may include a collection of individual, but linked software components and subroutines, including dynamic-link libraries and application programming interfaces for providing the functionality of the present invention.

A content cache 180 is provided for receiving and storing electronic content, including audio, video, and multimedia content, from a broadcast media content provider 200 via the satellite 130 and satellite receiver 140. Likewise, the broadcast content may be received via a cable system or other suitable transport device. A set-top box 185 is provided for directing content stored on the content cache 180 to the personal computer 160 or to a variety of other media devices, such as the television 195, a stereo system (not shown), a personal digital assistant (not shown), or any other suitable electronic device for receiving and displaying or playing electronic content such as audio, video, or multimedia content. According to a typical embodiment, the set-top box 185 and content cache 180 may be integrated as a single device and may be supplied by the content providers 200 to allow the end users at end-user site 150 to receive and enjoy the requested content.

Referring still to FIG. 4, the transport proxy server 250 is located at a telecommunications central office site 240. As is known to those skilled in the art, telecommunications service providers provide services to a variety of end users via central office sites located among collections of end users for distributing voice and data content from a broader telecommunications network to end users connected to a given central office 240. According to the present invention, the transport proxy server 250 is located at the central office 240 for providing services in accordance with an embodiment of the present invention to the end-user site 150. The end-user site 150 is illustrative of a number of end-user sites 150 that may be connected via voice trunk circuits and data links, such as the data link 125, to the central office 240 for providing telecommunication services.

Referring to the central office 240, the transport proxy server 250 is a general purpose computing system that provides services to other computers, such as the personal computer 160 that act as client computers to the transport proxy server 250. The transport proxy server 250 includes general purpose computing capabilities, including data processing, data retrieval, data storage, and data transmission. The transport proxy server 250 includes memory capacity for containing application programs and associated data required for processing content requests received from the personal computer 160 according to an embodiment of the presents invention. According to an embodiment of the present invention, the transport proxy server 250 may also save information acquired from elsewhere on the Internet 120 and make that information available to other computers in the immediate area, such as the personal computer 160. For example, if several users connect to the same Internet web site 220 through the transport proxy server 250, each page of information from the Internet web site 220 is downloaded from the Internet web site 220 only once to the transport proxy server and then is provided to all users.

The URL cache database 255 includes a memory storage system for storing content request information received by the transport proxy server 250 from the proxy management system 225. According to an embodiment of the present invention, an index including the uniform resource locators (URL) associated with Internet-based web sites containing electronic content that has been transmitted according to the broadcast media transport mechanism, described above, to the end-user site and stored on the content cache 180 may be maintained on the database 255. Paths to content stored in the content cache 180 may also be maintained on the database 255.

As illustrated in FIG. 4, the personal computer 160 at the end-user site 150 is functionally connected to the transport proxy server 250 via a data link 125. The data link 125 is illustrative of any telecommunications service line capable of carrying data from an Internet web site 220 across the Internet 120 to the personal computer 160 via the transport proxy server 250. According to an exemplary embodiment of the present invention, the data link 125 includes a digital subscriber line (DSL) capable of high-speed and high-volume electronic data transmission. Electronic content transmitted from a web site 220 across the Internet 120 to the personal computer 160 is transmitted according to well-known transmission protocols including hypertext transfer protocol (HTTP) and file transfer protocol (FTP).

Figure 6:
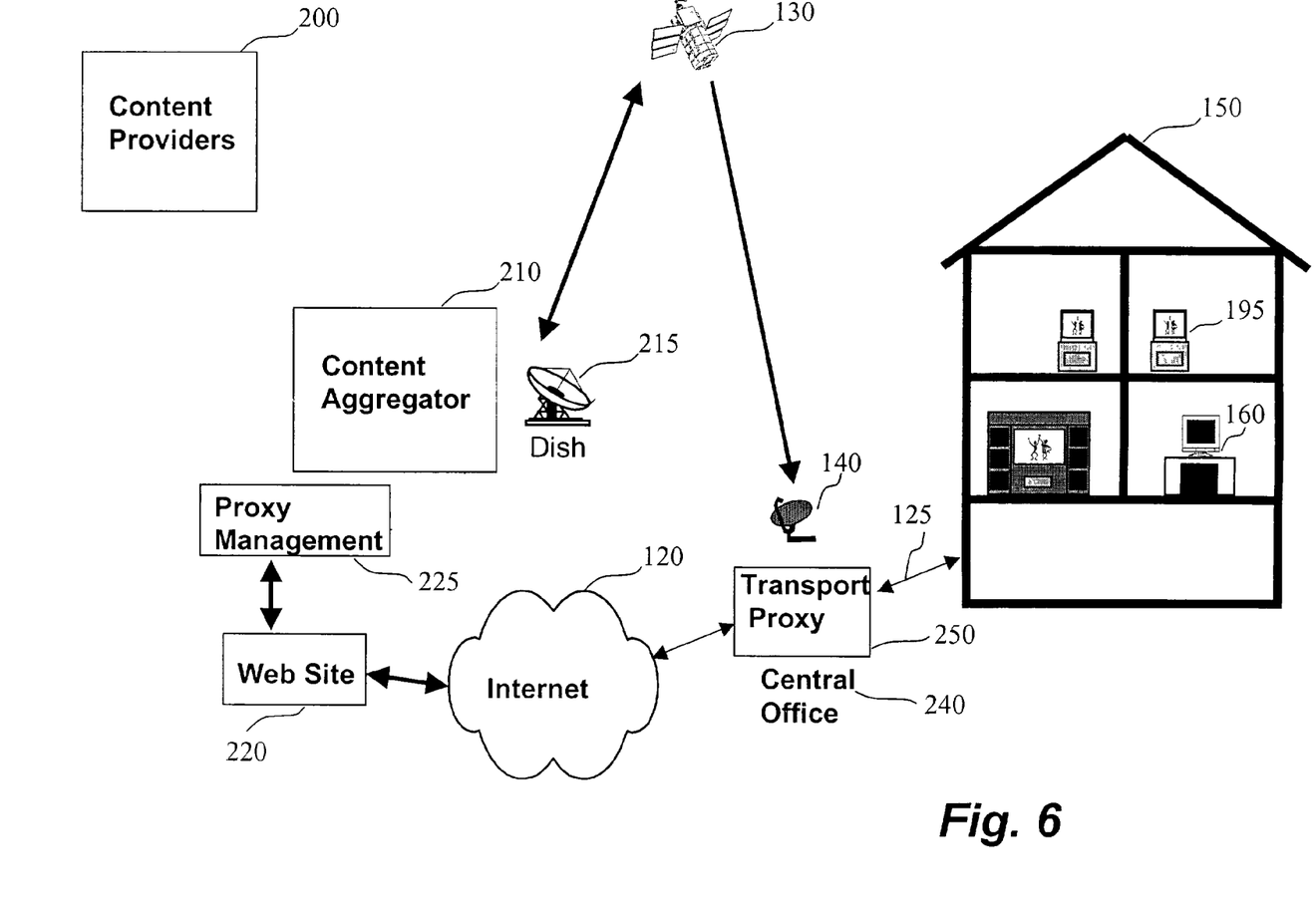
FIG. 6 is a simplified block diagram of the system illustrated in FIG. 3 including a proxy management system for managing electronic content and illustrating a telecommunications system central office site including a transport proxy server for processing content requests according to an alternate embodiment of the present invention.

FIG. 6 is a simplified block diagram of the system illustrated in FIG. 3 including a proxy management system for managing electronic content and illustrating a telecommunications system central office site including a transport proxy server for processing content requests according to an alternate embodiment of the present invention. According to an alternate embodiment of the present invention, content transmitted from the content providers 200 via the content aggregator 210 and the satellite 130 or similar cable system or other transmission system is transmitted to a receiver 145 at the central office site 240, as opposed to transmitting the content directly to an end user at the end-user site 150. According to this embodiment of the present invention, content transmitted to the central office 240 is stored in a content cache at the central office 240 for subsequent distribution out to various end users at end-user sites 150.

Figure 7:
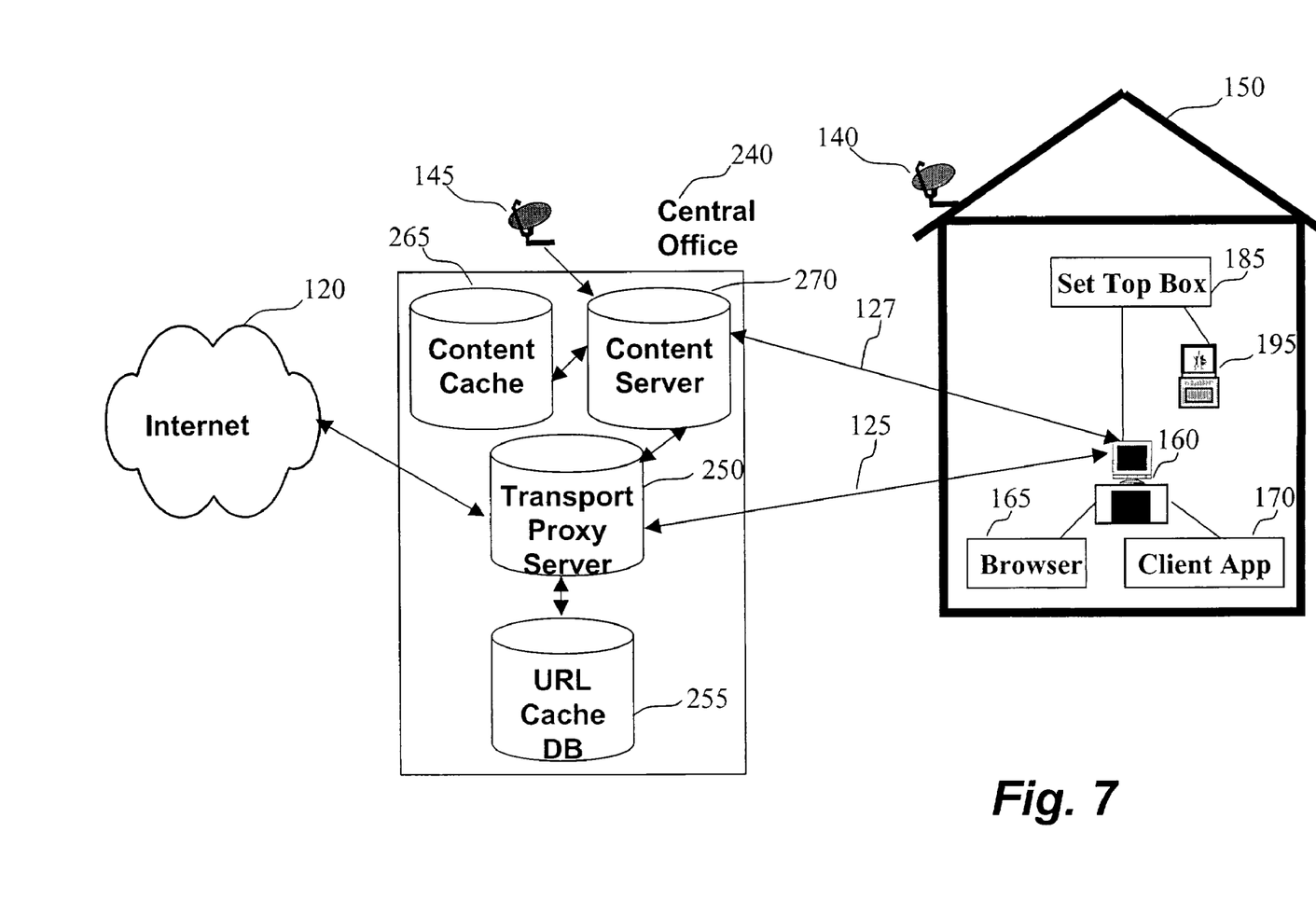
FIG. 7 is a simplified block diagram of the system illustrated in FIG. 4 including the components of an end-user site and the components of a telecommunications system central office site for receiving, storing, and utilizing received broadcast media content and for processing electronic content requests through a transport proxy server according to an alternate embodiment of the present invention.

Referring now to FIG. 7, according to an alternative embodiment of the present invention, the central office 240 includes a content server 270 for receiving electronic content via the receiver 145 from the content providers 200 via the content aggregator 210. Once the content server 270 receives content from the content providers 200, that content is stored at a content cache 265 at the central office 240 for subsequent distribution to end users at end-user sites 150. The content server 270 is a general purpose computing system similar to the transport proxy server 250 for communicating with and providing data to client computers such as the computer 160 located at the end-user site 150. A separate data link 127 such as a DSL line, described above, connects the content server 270 with the personal computer 160 of the end user. When the end user desires to review content received from the broadcast media transport mechanism, the client application 170 directs the personal computer 160 via the data link 127 to the content server 270 which in turn downloads information from the content cache 265 and transmits the information to the personal computer 160 for review by the end user.

According to an alternate embodiment of the present invention, when the user of the personal computer 160 requests information from an Internet web site URL, the transport proxy server 250 searches the URL cache database 255 to determine whether the content associated with that URL is already stored on the local central office content cache 265. If that content is stored locally on the content cache 265, the transport proxy server 250 redirects the user's request to the content server 270, and the content already stored on the content cache 265 is transmitted to the user via the data link 127.

Operation

Figure 5:
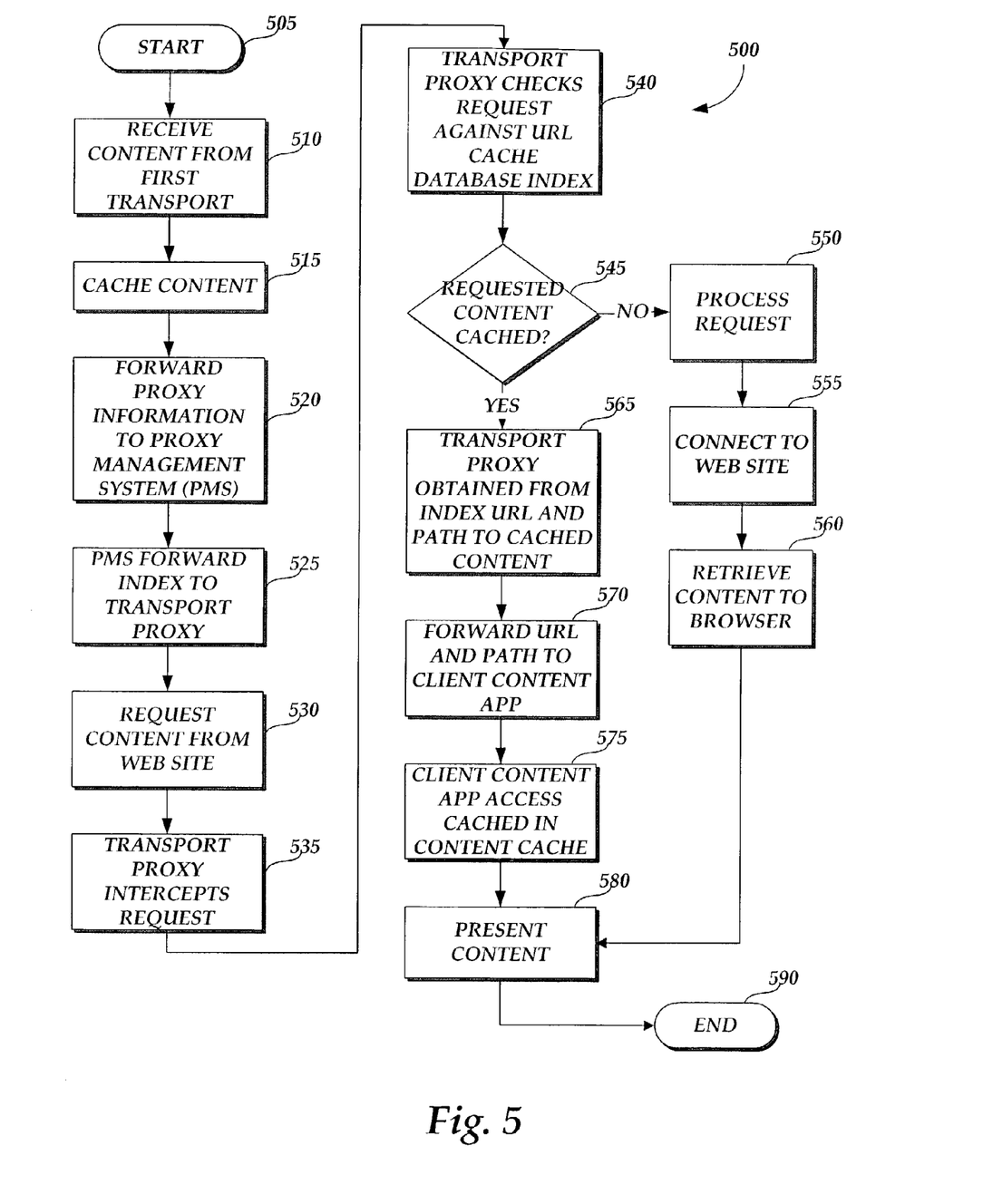
FIG. 5 is a flow diagram illustrating steps performed by a method and system of the present invention for redirecting electronic content requests to an alternate content transport mechanism and storage site.

FIG. 5 is a flow diagram illustrating steps performed by a method and system of the present invention for redirecting electronic content requests to an alternate content transport mechanism and storage site. For purposes of description of the operational flow illustrated in FIG. 5, consider for example that an end user subscribes to electronic content from a content provider 200 via a content aggregator 210 for delivery directly to the user's home at an end-user site 150. The method 500 begins at start step 505 and proceeds to step 510 where the user or subscriber receives content from a first transport. According to the present example, and according to an embodiment of the present invention, the user receives the content in response to a subscription with the content provider 200. For example, the user may have subscribed to news clips associated with a particular political candidate, or the user may have subscribed to all sports scores associated with a particular sport or groups of sports. In response to the user's subscription, the content along with the content of other content providers 200 is transmitted to the content aggregator 210 for transmission to the user at the end-user site 150.

At step 515, the content subscribed to by the user is transmitted via the transmitter 215 to the satellite 130 and to the satellite receiver 140 at the end-user site 150. The transmitted content is then directed to the content cache 180 and is stored for subsequent review by the user. If the user desires to review the content stored in the content cache 180, the user selects the client application 170 on the personal computer 160 to download the subscribed content to the personal computer 160 for review by the user. Alternatively, the user may utilize the functionality of the set-top box 185 to direct the subscribed content to a separate medium such as the television 195 for review.

At step 520, simultaneous with transmitting the content subscribed to by the user to the end-user site 150, as described with reference to step 515, the content provided by the content provider 200 is published on the web site 220 of the content provider 200 for provision to end users who request the content via the Internet 120. Proxy information required by the transport proxy mechanism 250 for managing content requests in accordance with an embodiment of the present invention is forwarded to the proxy management system 225. As described above, the proxy information includes an index of all uniform resource locators (URL) associated with web sites 220 from which content may be downloaded that is identical to content transmitted to end users from the alternate transport mechanism including the content aggregator 210, satellite 130 and receiver 140. Additionally, the proxy information includes paths to stored content on the content cache 180. At step 525, the PMS forwards the index of URLs and content paths to the transport proxy 250 via the Internet 120.

At step 530, the end user utilizing the computer 160 requests content from a web site 220 via the Internet 120. In order to make the request, the user opens an instance of the Internet browser application 165 and enters the URL of the web site associated with the requested content. At step 535, the request is transmitted from the personal computer 160 across the data link 125 to the central office 240 and is received by the transport proxy server 250 according to an embodiment of the present invention. At step 540, the transport proxy server 250 checks the requested content URL against the URLs contained in the URL cache database 255. As described above, the URL cache database 255 is populated with the index of URLs associated with content previously downloaded to the user's local content cache 180 according to the alternate transport mechanism.

At step 545, a determination is made as to whether the requested content is cached at the local content cache 180. If the URL requested by the user at step 530 is not located by the transport proxy server 250 on the URL cache database 255, the method proceeds to step 550, and the user's content request is processed. At step 555, the user is connected by the transport proxy server 250 to the web site 220 associated with the user's content request. At step 560, the content requested by the user is retrieved to the user's Internet browser application 165, and at step 580, the content is presented to the user for the user's review.

Referring back to step 545, if the URL requested by the user at step 530 is located in the URL cache database 255 by the transport proxy server 250, the method proceeds to step 565, and the transport proxy server 250 obtains from the URE cache database 255 a path to the cached content located on the local content cache 180. At step 570, the transport proxy server 250 forwards the URL and path associated with the cached content to the client content application 170 via the data link 125, as described above. At step 575, the client content application 170 utilizes the URL and memory path received from the transport proxy server 250 to access the requested content stored on the content cache 180. At step 580, the requested content is displayed to the user at the user's personal computer 160. The foregoing process is seamless to the user because the user has received the requested content quickly and efficiently after making the request without the need for pulling the content from a web site 220 across the Internet 120, and thereby needlessly using data link bandwidth and processor time of various computing components between the web site 220 and the end user.

Figure 8:
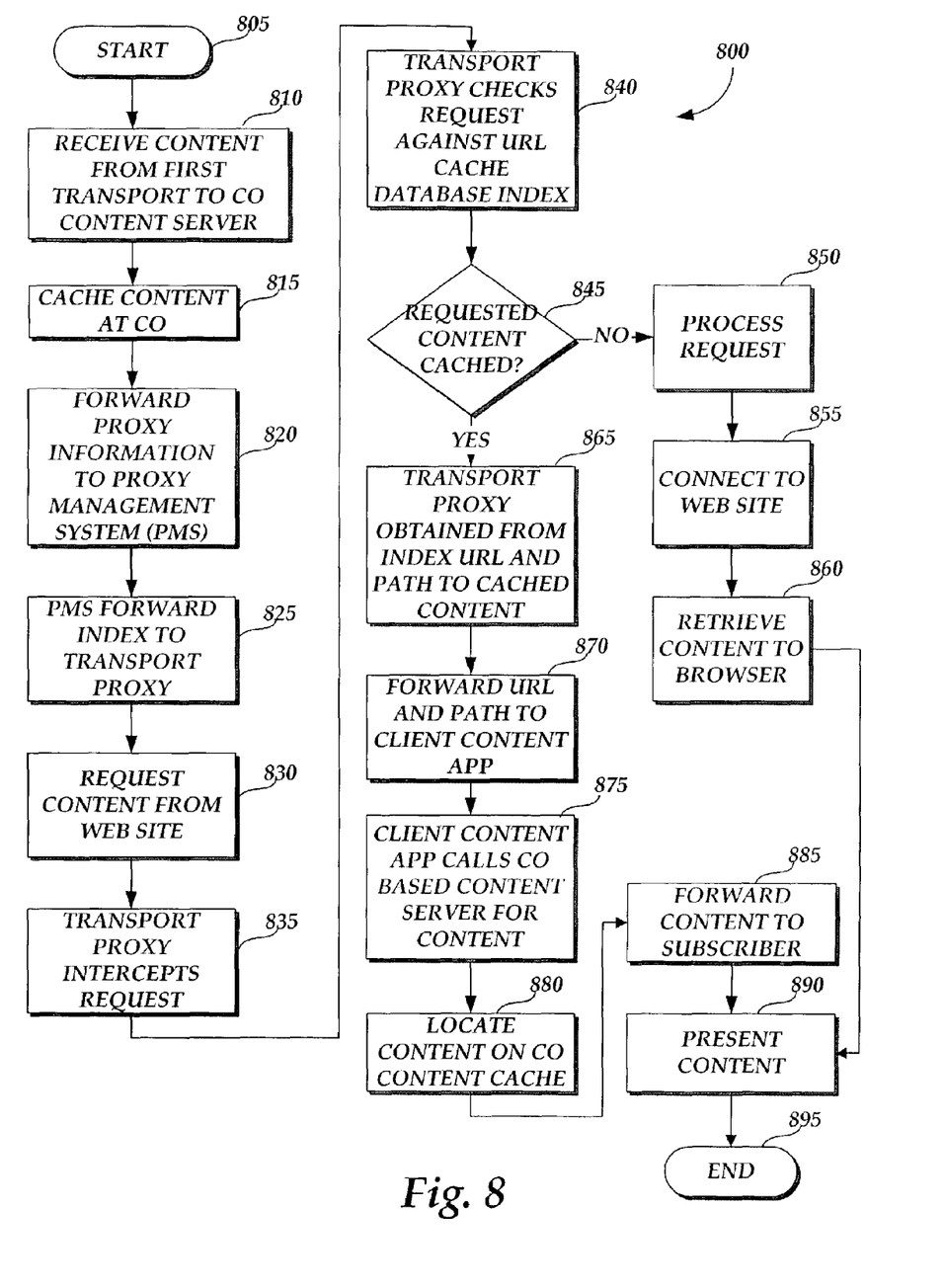
FIG. 8 is a flow diagram illustrating steps performed by a method and system of the present invention for redirecting electronic content requests to an alternate content transport mechanism and storage site according to an alternate embodiment of the present invention.

FIG. 8 is a flow diagram illustrating steps performed by a method and system of the present invention for redirecting electronic content requests to an alternate content transport mechanism and storage site according to an alternate embodiment of the present invention where content from the first transport mechanism is cached at the central office content cache 265.

The method 800 begins at start step 805 and proceeds to step 810 where the user or subscriber receives content from a first transport is received at the central office content server 270. At step 815, the content subscribed to by the user is transmitted via the transmitter 215 to the satellite 130 and to the satellite receiver 145 at the central office site 240. The transmitted content is then directed to the content cache 265 and is stored for subsequent transmission to an end user via the data link 127. If the user desires to review the content stored in the content cache 180, the user selects the client application 170 on the personal computer 160 to download the subscribed content to the personal computer 160 for review by the user. Alternatively, the user may utilize the functionality of the set-top box 185 to direct the subscribed content to a separate medium such as the television 195 for review.

At step 820, simultaneous with transmitting the content subscribed to by the user to the central office content server 270, as described with reference to step 815, the content provided by the content provider 200 to the end user is published on the web site 220 of the content provider 200 for provision to end users who request the content via the Internet 120. Proxy information required by the transport proxy mechanism 250 for managing content requests in accordance with an embodiment of the present invention is forwarded to the content management system or proxy management system 225. As described above, the proxy information includes an index of all uniform resource locators (URL) associated with web sites 220 from which content may be downloaded that is identical to content transmitted to end users from the alternate transport mechanism including the content aggregator 210, satellite 130 and receiver 140. Additionally, the proxy information includes paths to stored content on the content cache 180. At step 825, the PMS forwards the index of URLs and content paths to the transport proxy 250 via the Internet 120.

At step 830, the end user utilizing the computer 160 requests content from a web site 220 via the Internet 120. In order to make the request, the user opens an instance of the Internet browser application 165 and enters the URL of the web site associated with the requested content. At step 835, the request is transmitted from the personal computer 160 across the data link 125 to the central office 240 and is received by the transport proxy server 250 according to an embodiment of the present invention. At step 840, the transport proxy server 250 checks the requested content URL against the URLs contained in the URL cache database 255. As described above, the URL cache database 255 is populated with the index of URLs associated with content previously downloaded to the central office content cache 265 according to the alternate transport mechanism.

At step 845, a determination is made as to whether the requested content is cached at the central office content cache 265. If the URL requested by the user at step 830 is not located by the transport proxy server 250 on the URL cache database 255, the method proceeds to step 850 and the user's content request is processed. At step 855, the user is connected by the transport proxy server 250 to the web site 220 associated with the user's content request. At step 860, the content requested by the user is retrieved to the user's Internet browser application 165, and at step 890, the content is presented to the user for the user's review.

Referring back to step 845, if the URL requested by the user at step 830 is located in the URL cache database 255 by the transport proxy server 250, the method proceeds to step 865, and the transport proxy server 250 obtains from the URL cache database 255 a path to the cached content located on the central office content cache 265. At step 870, the transport proxy server 250 forwards the URL and path associated with the cached content to the client content application 170 via the data link 125, as described above.

At step 875, in response to receipt of the URL and content path from the transport proxy server 250, the client application 170 calls the content server 270 located at the central office 240 via the data link 127 to obtain the requested content for presentation to the user at the personal computer 160. At step 880, the content server 270 locates the requested content using the path to the requested content at content cache 265. At step 885, the content server 270 sends the requested content to the client application 170 via the DSL data link 127. At step 890, the client application 170 presents the requested content to the user via the personal computer 160. The method ends at step 895.

As described above with reference to the various embodiments of the present invention, the transport proxy server intercepts content requests from an end user and determines whether that content has already been downloaded and stored locally, either at an end-user site or at a telecommunications system central office site. If the requested content has been transmitted and stored locally via a first transport mechanism, the transport proxy server of the present invention redirects the user's request so that the request is filled utilizing the locally stored content so as to avoid the needless use of data link bandwidth and processor time to download the same information a second time from an Internet-based web site via a second transport mechanism.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method comprising:
   receiving, at a transport proxy server, a plurality of Uniform Resource Locators (URLs) associated with a first content transmitted to an end-user site via a first transport mechanism, the first content stored locally at the end-user site and the transport proxy server remote to the end-user site, and wherein each URL of the plurality of URLs is associated with a corresponding website of a plurality of websites at which the first content is available via a second transport mechanism;
   storing the plurality of URLs at the transport proxy server;
   receiving, at the transport proxy server, a request for content from the end-user site via the second transport mechanism, the request for content including a select URL associated with a first website accessible via the second transport mechanism;
   comparing, at the transport proxy server, the select URL with each of the plurality of URLs; and
   responsive to determining a match between the select URL and a URL of the plurality of URLs:
      determining, at the transport proxy server, a memory path to a location of the first content at a local content cache at the end-user site; and
      transmitting an indicator of the memory path from the transport proxy server to the end-user site.

2. The method of claim 1, further comprising:
   responsive to determining the select URL does not match any URL of the plurality of URLs, forwarding the request for content to a website associated with the select URL via the second transport mechanism.

3. The method of claim 1, further comprising:
   storing the first content at the location of the local content cache at the end-user site; and
   providing an indicator of the location to the transport proxy server.

4. The method of claim 1, further comprising:
   responsive to receiving the indicator of the memory path at the end-user site:
      accessing the first content from the location of the local content cache based on the indicator; and
      presenting the first content at the end-user site.

5. The method of claim 1, further comprising:
   publishing the first content to the websites corresponding to the plurality of URLs.

6. The method of claim 1, further comprising:
   publishing the first content to each of a plurality of websites;
   aggregating the first content with second content at a content aggregator;
   transmitting the first content and the second content to the end-user site via the first transport mechanism; and
   responsive to transmitting the first content to the end-user site, transmitting URLs associated with the plurality of websites to the transport proxy server as the plurality of URLs.

7. The method of claim 1, wherein the transport proxy server is located at a central office site of a telecommunications system.

8. The method of claim 7, wherein the end-user site and the central office site are connected via a digital subscriber line (DSL).

9. The method of claim 7, wherein the end-user site and the central office site are connected via a cable network.

10. The method of claim 1, wherein the first transport mechanism comprises a satellite-based media broadcast mechanism and the second transport mechanism comprises an Internet-based mechanism.

11. The method of claim 1, wherein the first content comprises multimedia content.

12. The method of claim 11, wherein the multimedia content comprises at least one of video content or audio content.

13. A telecommunications system comprising:
   a central office remotely connected to an end-user site and comprising:
      a database configured to store a plurality of Uniform Resource Locators (URLs) associated with a first content transmitted to the end-user site via a first transport mechanism, the first content stored locally at the select end-user site, and wherein each URL of the plurality of URLs is associated with a corresponding website of a plurality of websites at which the first content is available via a second transport mechanism; and
   a transport proxy server configured to:
      intercept a request for content transmitted from the end-user site via the second transport mechanism, the request for content including a select URL associated with a first website accessible via the second transport mechanism;
      compare the select URL with each of the plurality of URLs stored at the database; and
      responsive to determining a match between the select URL and a URL of the plurality of URLs:

determine a memory path to a location of the first content at a local content cache at the end-user site; and transmit an indicator of the memory path from the transport proxy server to the end-user site.

14. The telecommunications system of claim 13, wherein the transport proxy server further is configured to:
responsive to determining the select URL does not match any URL of the plurality of URLs, forward the request for content to a website associated with the select URL via the second transport mechanism.

15. The telecommunications system of claim 13, further comprising:
the end-user site, wherein the end-user site is configured to:
store the first content at the location of the local content cache; and
provide an indicator of the location to the transport proxy server.

16. The telecommunications system of claim 13, further comprising:
the end-user site, wherein the end-user site is configured to:
responsive to receiving the indicator of the memory path at the end-user site:
access the first content from the location of the local content cache based on the indicator; and
present the first content.

17. The telecommunications system of claim 13, further comprising:
a content aggregator configured to:
aggregate the first content with second content;
determine a plurality of websites at which the first content is published;
transmit the first content and the second content to the end-user site via the first transport mechanism; and
responsive to transmitting the first content to the end-user site, transmit URLs associated with the plurality of websites to the transport proxy server as the plurality of URLs.

18. The telecommunications system of claim 13, wherein the end-user site and the central office site are connected via a digital subscriber line (DSL).

19. The telecommunications system of claim 13, wherein the end-user site and the central office site are connected via a cable network.

20. The telecommunications system of claim 13, wherein the first transport mechanism comprises a satellite-based media broadcast mechanism and the second transport mechanism comprises an Internet-based mechanism.

21. The telecommunications system of claim 13, wherein the first content comprises multimedia content.

22. The telecommunications system of claim 21, wherein the multimedia content comprises at least one of video content or audio content.

23. The telecommunications system of claim 13, further comprising:
the end-user site, the end-user site comprising at least one of a set top box, a personal computer, a personal digital assistant, or a television.

* * * * *